United States Patent [19]
Peek et al.

[11] Patent Number: 5,462,380
[45] Date of Patent: Oct. 31, 1995

[54] DETENT

[75] Inventors: Gregory A. Peek; William B. Lytle, both of Highlands Ranch; John A. Dyer, Evergreen, all of Colo.

[73] Assignee: LaBac Systems, Inc., Highlands Ranch, Colo.

[21] Appl. No.: 337,324

[22] Filed: Nov. 10, 1994

[51] Int. Cl.⁶ .................................................. F16B 21/00
[52] U.S. Cl. .......................... 403/329; 285/308; 285/319
[58] Field of Search .................................. 285/303, 308, 285/319; 403/321, 326, 329

[56] References Cited

U.S. PATENT DOCUMENTS

| | | | |
|---|---|---|---|
| 252,169 | 1/1882 | Archer . | |
| 1,202,601 | 10/1916 | Snyder | 285/303 |
| 1,217,062 | 2/1917 | Powers | 285/303 |
| 2,495,754 | 1/1950 | Nance | 285/308 X |
| 2,755,055 | 7/1956 | Kreuscher . | |
| 3,366,406 | 1/1968 | Morris | 285/303 X |
| 3,453,027 | 7/1969 | Pivacek . | |
| 4,247,216 | 1/1981 | Pansini | 403/329 X |
| 4,957,303 | 9/1990 | Romatz . | |

Primary Examiner—Dave W. Arola
Attorney, Agent, or Firm—Ralph F. Crandell; Holland & Hart

[57] ABSTRACT

A detent for releasably securing an inner telescoping tube within an outer telescoping tube. The said tubes having alignable openings in the walls thereof for receiving the detent. The detent is formed by a detent pin which extends through the tube wall openings and releasably latches the tubes together. A leaf spring secured at the inserted end of said inserted tube extends within the outer tube into supporting and biasing engagement with the detent pin. The spring biases said pin into the latching position. For releasing the detent, a bell crank is pivotally mounted within the inserted tube. One end of the bell crank is engaged with the locking pin and biasing spring and the other end is secured to an actuating knob which extends through the wall of the inserted tube.

1 Claim, 2 Drawing Sheets

1

DETENT

BACKGROUND OF THE INVENTION

1. Field of the invention

The present invention relates to detents for releasably latching telescoping tubes together. More particularly, the invention relates to detents for securing an arm rest to a wheelchair frame.

2. Brief Description of the Prior Art

Push button detents have long been used for releasably securing telescoping tubes together. Such detents conventionally utilize spring biased buttons mounted on the inner telescoping tube with the button head projecting through corresponding apertures, in the walls of the tubes for latching the tubes together. By pushing the button, the tubes can be released for relative sliding movement.

OBJECTS OF THE INVENTION

The object of the present invention is to provide an improved latching detent for releasably securing telescoping tubes together.

Another object is to provide an improved detent mechanism which is easy to operate and yet provides a secure latch between the telescoping tubes.

Other objects and advantages of the present invention will become apparent as the following description proceeds taken in conjunction with the accompanying drawings.

SUMMARY OF INVENTION

The present invention is embodied in a detent for releasably securing an inner telescoping tube within an outer telescoping tube. The tubes have alignable openings in the walls thereof for receiving the detent. The detent is formed by a detent pin which is mounted within the inner tube and extends through an aperture in the tube wall into a corresponding aperture in the outer tube wall for releasably latching the tubes together. A leaf spring secured at the end of the inserted tube extends within the tube into biasing engagement with the detent pin. The spring biases or urges the pin into the latching position. For releasing the detent, a bell crank is pivotally mounted within the inserted tube, and has one crank end engaged with the locking pin and biasing spring, and the opposite end engaged with an actuating knob. The knob extends through the wall of the inserted tube into operative engagement with the opposite end of the bell crank. By pushing on the actuating knob the locking pin is moved against the bias of the spring and withdraws the locking pin from the aperture in the outer tube thereby releasing the tubes for separation.

DESCRIPTION OF THE PREFERRED EMBODIMENT

Figure 1:
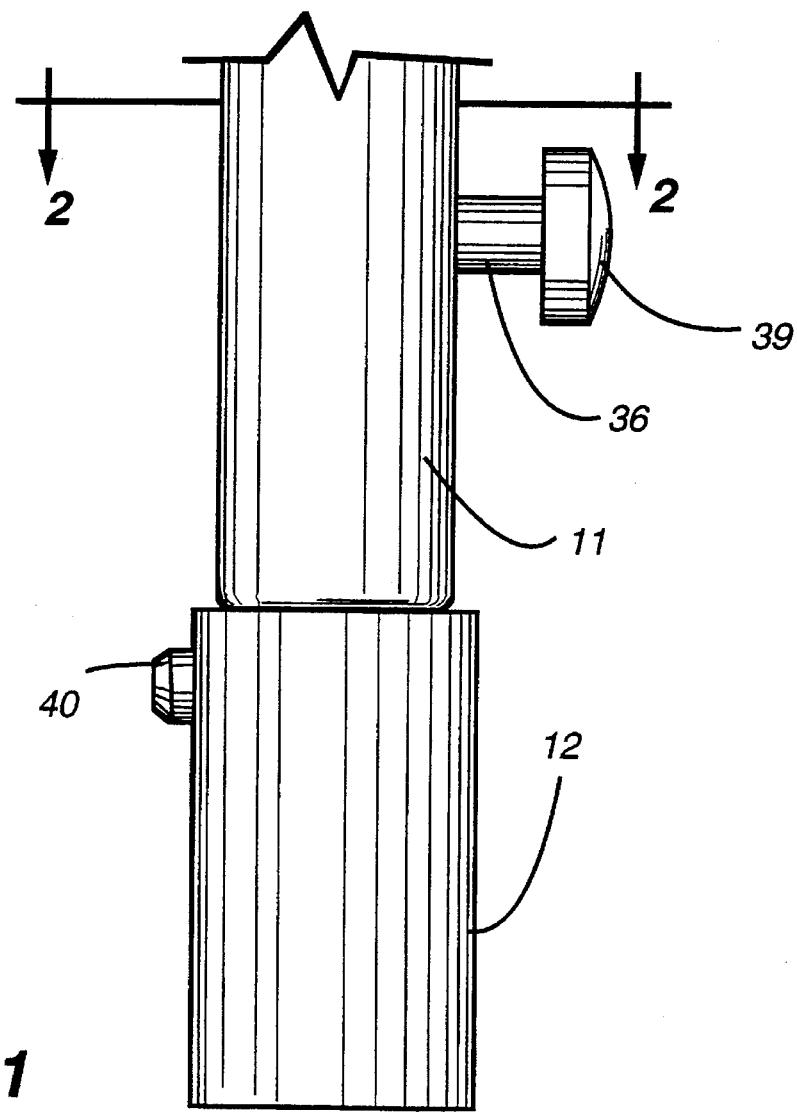
FIG. 1 is an elevation view of two telescoping tubes latched by a detent embodying the present invention.
Figure 2:
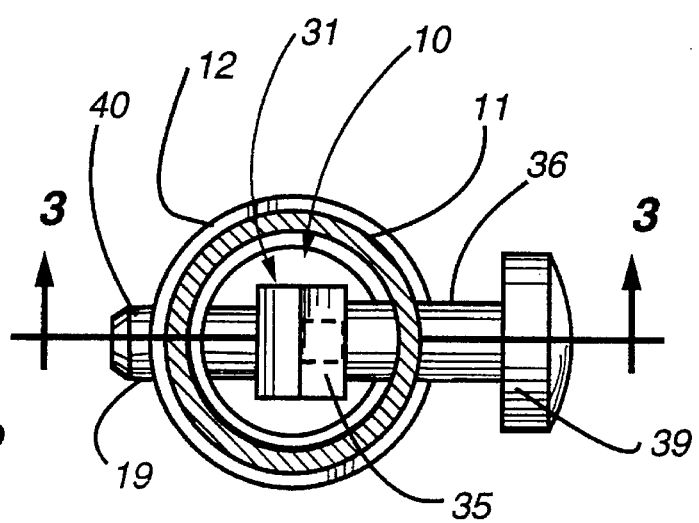
FIG. 2 is a section view taken substantially in the plane of line 2—2 on FIG. 2.
Figures 3, 4:
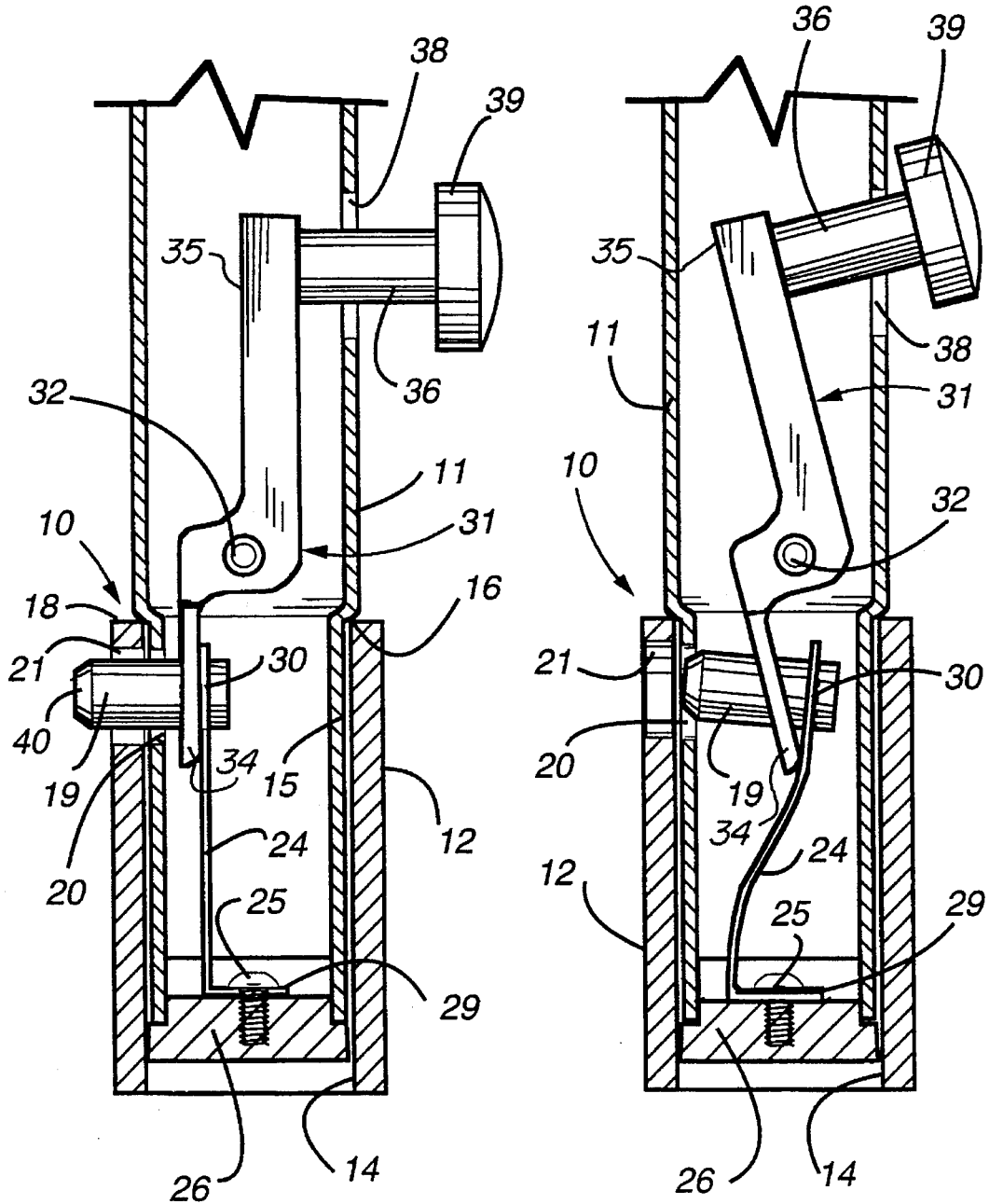
FIG. 3 is a section view taken substantially in the plane of line 3—3 on FIG. 2.
FIG. 4 is a section view similar to FIG. 3 but showing the latch in the tube release position.

The present invention is embodied in a detent 10 for securing an inserted telescoping tube 11 in an outer telescoping tube 12. The outer tube 12 defines a bore 14 into which a reduced diameter end 15 of the tube 11 is inserted. Insertion of the inner tube 11 into the outer tube 12 is limited by a shoulder 16 defined on the inner tube 11 which engages the insertion end 18 of the outer tube 12.

The detent comprises a latching or detent pin 19 extending through aligned apertures 20, 21 in the inserted tube end 15 of the inner tube 11 and the wall of the outer tube 12.

For biasing the latching pin 19 outwardly through the apertures 20, 21, a leaf spring 24 is secured by a fastener 25 such as a machine screw to a mounting block 26 attached to the inserted end 15 of the inner telescoping tube 11. The fastener 25 is inserted through an aperture 28 in an inturned end 29 of the leaf spring 24.

At its free end, the leaf spring 24 defines a slot or aperture (not shown) which engages in an annular slot or groove 30 in the detent latching pin 19.

For releasing the latching pin 19 against the force of the biasing spring 24 to remove the latching pin 19 from the aperture 21 in the external tube 12 and allow the telescoping tube 11 to be separated from the receiving tube 12, a bell crank 31 is pivotally mounted on a roll pin or pivot 32 extending between diametrically opposite walls of the inserted tube 11. At one end 34 the bell crank 31 is bifurcated to straddle the locking pin 19 adjacent the leaf spring 24. At its opposite end 35, the bell crank 31 defines a threaded aperture (not shown) which receives the threaded end of a release rod 36 extending through an aperture 38 in the wall of the telescoping tube 11. The rod 36 is provided at its outer end with an actuating knob or button 39. By pushing on the actuating knob 39, the bell crank 31 rotates about the roll pin pivot 32 and acts against the biasing spring 24 to pull the lock pin 19 out of the aperture 21 in the external tube 12, thereby enabling the inner or inserted telescoping tube 11 to be removed from the outer or external tube 12. To facilitate insertion and withdrawal of the lock pin 16, the outer end of the pin may be provided with a taper or chamfer 40. Further, the support provided by the inserted tube shoulder 16 eliminates shear stress on the detent pin 19 thereby easing the release of the detent.

The detent structure herein described finds particular but not necessarily exclusive utility for latching the support post of a wheelchair arm into a tubular socket on the wheelchair frame. The knob may be large enough for easy access by a handicapped user of the wheelchair.

While a certain preferred embodiment of the present invention has been shown in the drawings and described above in detail, it should be understood that there is no intention to limit the invention to the specific form disclosed. On the contrary, the intention is to cover all modifications, alternative constructions, equivalents and uses falling within the spirit and scope of the invention as expressed in the appended claims.

We claim:

1. A detent for releasably securing an inner telescoping tube within an outer telescoping tube, comprising an inner tube and an outer tube said tubes having alignable openings in the walls thereof for receiving the detent, said detent comprising a detent pin adapted to extend through said tube wall openings for releasably latching said tubes together, a leaf spring secured at the inserted end of said inserted tube and extending within said tube into biasing engagement with said detent pin for biasing said pin into the latching position, a bell crank pivotally mounted within said inserted tube and having one crank end engaged with said biasing spring adjacent said biasing engagement of said leaf spring with said detent pin an actuating knob extending through the wall of said inserted tube into operative engagement with the opposite end of said bell crank whereby pushing on said actuating knob moves said spring and thereby said locking pin against the bias of said spring to withdraw said locking pin from the aperture in the outer tube thereby releasing said tubes for separation.

* * * * *